United States Patent
Kim

(10) Patent No.: US 9,255,652 B2
(45) Date of Patent: Feb. 9, 2016

(54) CLAMPING STRUCTURE FOR MOUNTING REDUCER

(71) Applicant: Hyung Soo Kim, Seoul (KR)

(72) Inventor: Hyung Soo Kim, Seoul (KR)

( * ) Notice: Subject to any disclaimer, the term of this patent is extended or adjusted under 35 U.S.C. 154(b) by 143 days.

(21) Appl. No.: 14/100,107

(22) Filed: Dec. 9, 2013

(65) Prior Publication Data

US 2014/0360737 A1   Dec. 11, 2014

(30) Foreign Application Priority Data

Jun. 5, 2013   (KR) .................. 10-2013-0064641
Sep. 10, 2013  (KR) .................. 10-2013-0108247

(51) Int. Cl.
*F16L 3/00*   (2006.01)
*F16L 3/24*   (2006.01)
*F16L 3/10*   (2006.01)

(52) U.S. Cl.
CPC ... *F16L 3/00* (2013.01); *F16L 3/24* (2013.01); *F16L 3/006* (2013.01); *F16L 3/1075* (2013.01)

(58) Field of Classification Search
CPC ............ F16L 3/24; F16L 3/006; F16L 3/1075
See application file for complete search history.

(56) References Cited

U.S. PATENT DOCUMENTS

| | | | | |
|---|---|---|---|---|
| 5,622,341 | A * | 4/1997 | Stana ..................... | 248/74.1 |
| 7,845,599 | B2 * | 12/2010 | Jackson ................... | 248/73 |
| 7,878,464 | B2 * | 2/2011 | Oh ......................... | 248/65 |
| 8,109,482 | B2 * | 2/2012 | Oh ......................... | 248/342 |
| 8,272,615 | B2 * | 9/2012 | Silcox et al. ............ | 248/342 |
| 2001/0030269 | A1 * | 10/2001 | Evans et al. ............. | 248/214 |
| 2011/0186697 | A1 * | 8/2011 | Hickle et al. ............ | 248/75 |
| 2011/0215566 | A1 * | 9/2011 | Stempo et al. .......... | 285/144.1 |
| 2011/0260012 | A1 * | 10/2011 | Oh ......................... | 248/89 |
| 2013/0048822 | A1 * | 2/2013 | Liu et al. ................. | 248/316.5 |
| 2013/0105641 | A1 * | 5/2013 | Feenstra ................. | 248/75 |

* cited by examiner

*Primary Examiner* — Gary Hoge
(74) *Attorney, Agent, or Firm* — Occhiuti & Rohlicek LLP

(57) ABSTRACT

Disclosed herein is a clamping structure for mounting a reducer. The clamping structure include a clamp body 431 that is formed at opposite sides thereof with a door connecting portion 431a and a latch member connecting portion 431b to form a rectangular shape with one open side, and a clamp door 434 that can be rotated about a hinge pin 433 formed at the door connecting portion 431a, wherein the clamp door 431 is formed at one side thereof with a fastening portion, to which a latch portion of a latch member 450 is latched to allow a lever handle 446 of a lever member 440 to be pushed, and wherein the lever member 440 is coupled at one end thereof to the latch member connecting portion 450 of the clamp body 431 by a hinge 444 and is rotatably coupled at a middle thereof to the latch member 450 by a hinge 454 of the latch member 450.

6 Claims, 9 Drawing Sheets

CLAMPING STRUCTURE FOR MOUNTING REDUCER

RELATED APPLICATIONS

Under 35 USC 119, this application claims the benefit of the priority date of Korean Application No. 10-2013-0064641, filed on Jun. 5, 2013 and Korean Application No. 10-2013-0108247, filed on Sep. 10, 2013, the contents of which are herein incorporated by reference.

BACKGROUND

1. Technical Field

The present invention relates to a clamping structure for mounting a reducer and, more particularly, to a clamping structure for mounting a reducer of fire sprinklers, in which a clamp door can be easily rotated about a rotation coupling point of a hinge pin to be tightly secured to an opposite side of the rotation coupling point.

2. Description of the Related Art

Generally, as buildings become taller and larger, various fire suppression apparatuses have been developed and used to achieve effective and efficient suppression of fire in the event of a fire in the buildings.

As fire suppression apparatuses are generally used, sprinklers capable of suppressing fire by spraying high-pressure water from the ceiling of each floor of buildings are essentially provided to the buildings.

In order to mount a sprinkler in a building, a main water supply pipe for supplying water through the ceiling is provided to the building, and the sprinkler is coupled to a connection pipe which connects a plurality of branch water supply pipes to the main water supply pipe, such that water is intensively supplied to a place, at which fire occurs, in order to suppress the fire.

In one example, referring to FIG. 1, Korean Utility Model Registration No. 20-0179175 assigned to the present inventor discloses a fire suppression apparatus including a sprinkler, which is connected to a lower side of a reducer 10 by a typical flexible joint and sprays water onto a predetermined place, wherein the reducer 10 is formed at four lateral sides thereof with contact surfaces 12 to be inserted into a square insertion hole 32, and a plurality of wing bolts 38 is secured to a predetermined number of screw holes 36 formed on a lateral side of a reducer securing bracket 30 having an opening 34, into which a square bar 20 is inserted, and applies pressure to the contact surfaces 12 of the reducer 10 by applying pressure to the square bar 20. The reducer securing bracket 30 is formed at upper and lower sides thereof with through-holes 35 and is secured to a screw support withdrawn from the ceiling by upper and lower nuts.

The contact surfaces 12 of the reducer 10 are formed by cutting a round outer surface of the reducer 10, and the reducer 10 is formed at the lower side thereof with a sprinkler mounting portion 26 to which a sprinkler head is secured.

In another example, referring to FIG. 2, a clamp 300 disclosed in Korean Patent No. 10-1014385 based on the technique of FIG. 1 can be moved to a desired place, with a support frame (square bar) 100 inserted into one side of a clamp body 131, and a nut 138c serving to open or close a clamp door 134 is loosened, such that the clamp door 134 can be rotated about a hinge pin 133 to be opened. The clamp body 131 and the clamp door 134 are formed with a clamp groove 132 and a coupling groove 135, respectively, to define a space capable of receiving a body 222 of a sprinkler 200 when the body 222 is inserted into the clamp 300. Thus, in order to provide a clamping state between the clamp 300 and the sprinkler 200, the body 222 of the sprinkler 200 is inserted into the clamp door 134 in an opening/closing direction of the clamp door 134 without separating a spray nozzle 224 from the body 222, and, with the clamp door 134 closed, a bolt coupling rod 137c coupled to the clamp body 131 is inserted into a securing groove 136 of the clamp door 134, and then, a nut 138c is fitted to the bolt coupling rod 137c.

However, as shown in FIG. 1, in the above example, since the square insertion hole 32 is formed in the reducer securing bracket 30 and the reducer 10 is inserted and secured thereto, the reducer 10 provides good tightness, but has a problem in that separation or disassembly is inconvenient.

Moreover, as shown in FIG. 2, in the other example, since the clamp 300 has the structure wherein the clamp door 134 is rotated about the rotation coupling point of the hinge pin 133 to allow the securing groove 136 of the clamp door 134 to be open at one side thereof such that the nut 138c is fitted to the bolt coupling rod 137c inserted into the securing groove 136, there are problems in that coupling is difficult and disassembly operation is inconvenient due to the need to rotate the nut 138c during disassembly. In addition, since the securing groove 136 of the clamp door 134 has the one side-open structure, when a strong torque of 900 Kg/m$^2$ or more is applied to the clamp 300, the clamp body 131 and the clamp door 134 come apart or are distorted, thereby making it difficult to use the clamp 300.

BRIEF SUMMARY

The present invention has been conceived to solve the above problems, and it is an aspect of the present invention to provide a clamping structure for mounting a reducer, in which a clamp door can be easily rotated about a rotation coupling point of a hinge pin to be rapidly and easily coupled to or separated from an opposite side of the rotation coupling point using a fixed hinge member, and a clamp body and the clamp door coupled to each other are prevented from coming apart or being distorted even by application of a strong torque of 900 Kg/m$^2$ or more thereto.

In accordance with one aspect of the present invention, a clamping structure for mounting a reducer is provided. The clamping structure include a clamp body 431 that is formed at opposite sides thereof with a door connecting portion 431a and a latch member connecting portion 431b to form a rectangular shape with one open side, and a clamp door 434 that can be rotated about a hinge pin 433 formed at the door connecting portion 431a, wherein the clamp door 431 is formed at one side thereof with a fastening portion, to which a latch portion of a latch member 450 is latched to allow a lever handle 446 of a lever member 440 to be pushed, and wherein the lever member 440 is coupled at one end thereof to the latch member connecting portion 450 of the clamp body 431 by a hinge 444 and is rotatably coupled at a middle thereof to the latch member 450 by a hinge 454 of the latch member 450.

The fastening portion may be a through hole-shaped fastening groove 436a formed through a front surface of the clamp door 434, and the latch portion of the latch member 450 may be a hook-shaped latch portion 452.

The fastening portion may be a linear fastening groove 436b formed on a front surface of the clamp door 434; the latch portion of the latch member 450 may be a cylindrical latch spindle 452a formed at one end of the latch member 450; the latch member 450 may be hingedly coupled to the middle of the lever member 440 by the hinge 454 and be formed at both sides thereof with guide bars 456; and the cylindrical latch spindle 452a is coupled to left and right coupling holes 452b of the guide bars 456 so as to be latched to the door member-fastening groove 436b formed on the front surface of the clamp door 434.

The fastening portion may be an opened door member-fastening groove 536a formed on a front surface of the clamp door 434; the latch portion of the latch member 450 may be a latch portion 552a formed at one end of the latch member 450 and connected to a connecting portion 552b to form a T shape such that the latch portion 552a can be latched to the opened door member-fastening groove 536a of the clamp door 434; and the latch member 450 may be hingedly coupled to the middle of the lever member 540 by a hinge 554.

In accordance with another aspect of the present invention, a clamping structure for mounting a reducer includes a clamp body 631 that is formed at opposite sides thereof with a door connecting portion 631a and a latch member connecting portion 631b to form a rectangular shape with one open side; and a clamp door 634 that can be rotated about a hinge pin 633 formed at the door connecting portion 631a, wherein the latch member connecting portion 631b is formed at one side thereof with an opened fastening groove 636, to which one end of a latch member 650 is latched to allow a lever handle 646 placed at one end of a lever member 640 to be pushed; wherein the lever member 640 is coupled to lever rotating holes 642 of the lever member 640 by a hinge 644 formed on the clamp door 634 and is rotatably coupled at a middle thereof to the latch member 650 by a hinge 654 of the latch member 650; and wherein the latch member 650 is hingedly coupled to a middle of the lever member 640 by the hinge 654 of the latch member 650, is provided at both sides thereof with guide bars 656, and is provided at one end thereof with a cylindrical latch spindle 652a, such that the cylindrical latch spindle 652a of the latch member 650 can be latched to the opened fastening groove 636 on the latch member connecting portion 631b to be pulled.

The latch member 650 may be formed at the one end thereof with an L-shaped latch portion 652 instead of the cylindrical latch spindle 652a, and the latch member connecting portion 631b may be formed at the one side thereof with a cylindrical latch spindle 636a instead of the opened fastening groove 636.

In accordance with a further aspect of the present invention, a clamping structure for mounting a reducer includes a clamp body 731 that is formed at opposite sides thereof with a door connecting portion 731a and a latch member connecting portion 731b to form a rectangular shape with one open side; and a clamp door 734 that can be rotated about a hinge pin 733 formed at the door connecting portion 731a, wherein the clamp door 734 is formed at one side thereof with a latch member fastening hole 737, through which a latch member 750 passes to be coupled to the clamp door 734, the latch member 750 having a linear body which is provided at one side thereof with a T-shaped latch spindle 751 and is formed at the other side thereof with threads 753 to be fastened to a nut 752, the clamp body 731 having a fastening groove 736 formed at each of upper and lower portions on an outer side of one end of the latch member connection portion 731b opposite the hinge pin 733.

As such, according to embodiments of the invention, the clamping structure allows the clamp door to be easily rotated about the rotation coupling point of the hinge pin so as to be rapidly and easily coupled to or separated from an opposite side of the rotation coupling point using a hinge member upon operation, and can prevent the clamp body and the clamp door from coming apart or being distorted even upon application of a strong torque of 900 Kg/m$^2$ or more thereto.

BRIEF DESCRIPTION OF THE DRAWINGS

The above and other aspects, features and advantages of the present invention will become apparent from the following description of embodiments given in conjunction with the accompanying drawings, in which.

DETAILED DESCRIPTION

Hereinafter, exemplary embodiments of the present invention will be described in detail with reference to the accompanying drawings.

Figure 1:
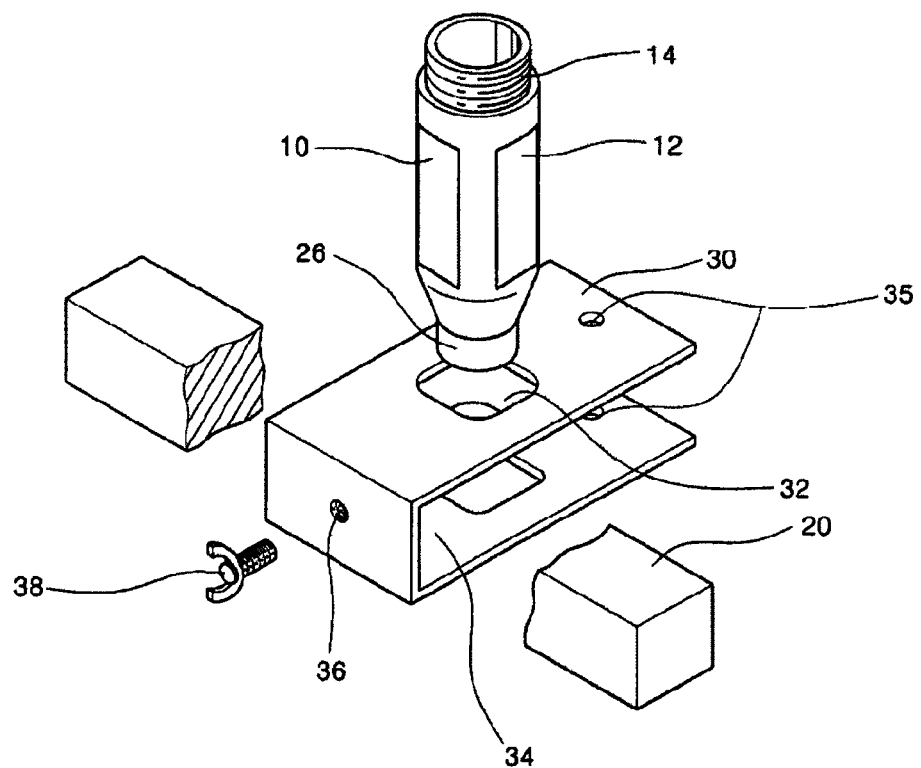
FIG. 1 shows a clamping structure of a sprinkler according to a first typical example.
Figure 2:
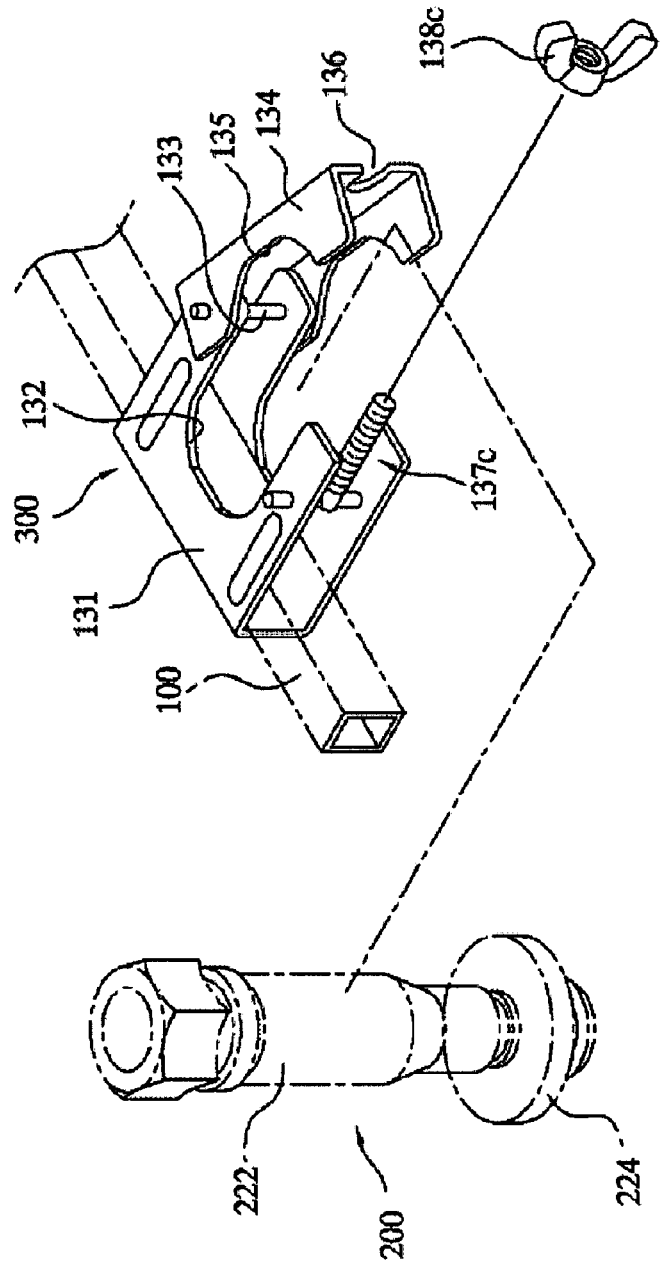
FIG. 2 shows a clamping structure of a sprinkler according to a second typical example.

It should be noted that, since the typical sprinkler according to the example shown in FIG. 2 is also applicable to the present invention, the sprinkler according to embodiments of the invention will be described using the same terms and reference numerals as those of the sprinkler shown in FIG. 2.

Figure 3:
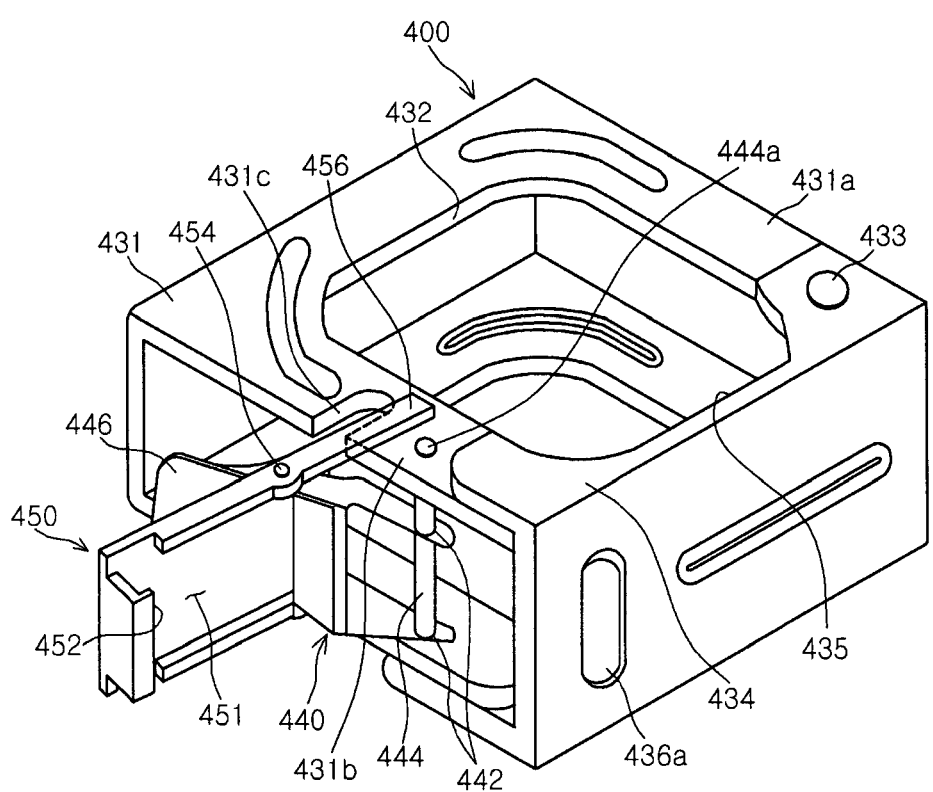
FIG. 3 is a perspective view of a clamping structure for mounting a reducer for sprinklers according to a first embodiment of the present invention.
Figure 4:
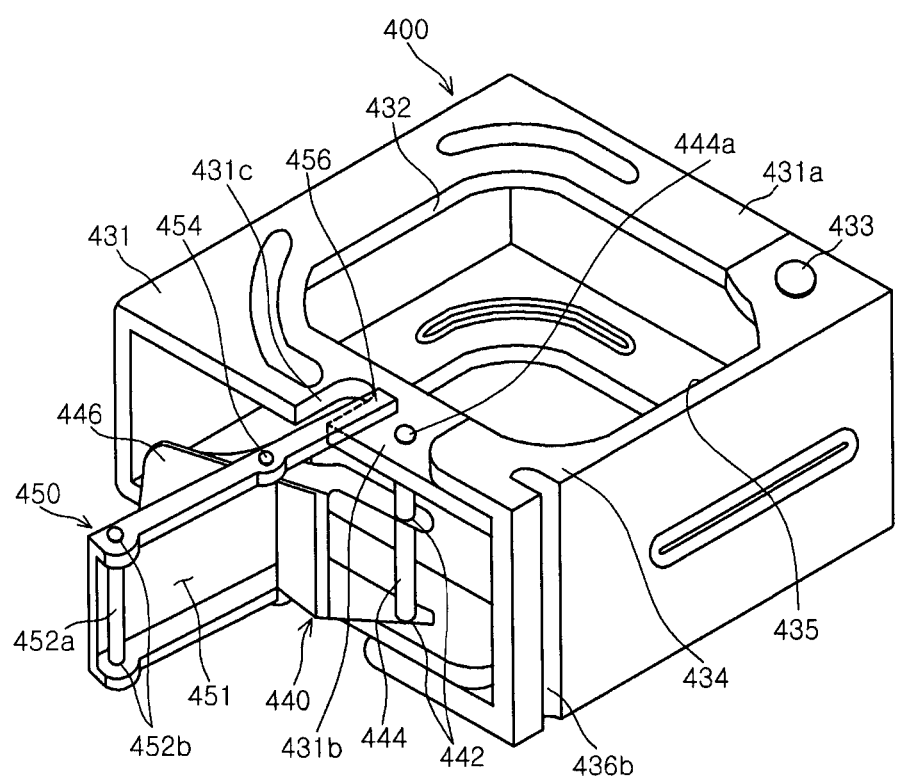
FIG. 4 is a perspective view of a modification of a latch member according to the first embodiment of the present invention.

FIG. 3 is a perspective view of a clamping structure for mounting a reducer for sprinklers according to a first embodiment of the present invention, and FIG. 4 is a perspective view of a modification of a latch member according to the first embodiment of the present invention.

Referring to FIGS. 3 and 4, according to a first embodiment of the invention, a clamp 400 includes a clamp body 431 that is formed at opposite sides thereof with a door connecting portion 431a and a latch member connecting portion 431b to form a rectangular shape with one open side, and a clamp door 434 that can be rotated about a hinge pin 433 formed at the door connecting portion 431a when a latch member 450 is released. According to this embodiment, the clamp 400 may be moved to a desired place, with a support frame 100 inserted into one side of the clamp body 431.

The clamp body 431 and the clamp door 434 are formed with a clamp groove 432 and a coupling groove 435, respectively, to define a space capable of receiving a body 222 of a sprinkler 200 when the body 222 is inserted into the clamp. Thus, in order to provide a clamping state between the clamp 400 and the sprinkler 200, the body 222 of the sprinkler 200 is inserted into the clamp body 431 in an opening/closing direction of the clamp door 434 without separating a spray nozzle 224 from the body 222, and with the clamp door 434 closed, a latch portion 452 of the latch member 450 is latched to a fastening groove 436a of the clamp door 434 and a lever handle 446 of a lever member 440 is pushed.

The lever member 440 is rotatably coupled to hinge holes 444a of the latch member connecting portion 431b by a hinge 444, which is coupled to lever rotating holes 442 of the lever member 440. In addition, the lever member 440 is rotatably coupled at the middle thereof to the latch member 450 by a hinge 454 of the latch member 450, and is provided at one end thereof with the level handle 446, by which the latch member 450 can be pulled after the latch member 450 is latched to the clamp door 434.

The latch member 450 includes a latch plate 451 and guide bars 456 formed at both sides of the latch plate 451 and coupled to the hinge 454. Here, the latch member 450 is hingedly coupled at one side of the latch plate 451 to the middle of the lever member 440 by the hinge 454 connected to the guide bars 456. In addition, the latch member 450 is formed so as not to be separated from the clamp body 431 and is formed at one end thereof with a hook-shaped latch portion 452 such that the latch portion 452 can be latched to a through hole-shaped fastening groove 436a of the clamp door 434, and a support shaft of the hinge 454 is received in a hinge receiving groove 431c to allow the clamp door 434 to be more tightly fastened to the clamp body 431 when the clamp door 434 is fastened thereto by pulling the lever handle 446 backward.

FIG. 4 shows a modification of the latch member according to the first embodiment of FIG. 3.

The latch member according to this embodiment has the same fundamental structure as that of the latch member shown in FIG. 3, and thus will be described using the same terms and reference numerals.

In this embodiment, the clamp 400 includes the clamp body 431 that is formed at opposite sides thereof with the door connecting portion 431a and the latch member connecting portion 431b to form a rectangular shape with one open side, and the clamp door 434 that can be rotated about a hinge pin 433 formed at the door connecting portion 431a when the latch member 450 is released. According to this embodiment, the clamp 400 may be moved to a desired place, with a support frame 100 inserted into one side of the clamp body 431.

The clamp body 431 and the clamp door 434 are formed with the clamp groove 432 and a coupling groove 435, respectively, to define a space capable of receiving a body 222 of the sprinkler 200 when the body 222 is inserted into the clamp. Thus, in order to provide a clamping state between the clamp 400 and the sprinkler 200, the body 222 of the sprinkler 200 is inserted into the clamp body 431 in an opening/closing direction of the clamp door 434 without separating the spray nozzle 224 from the body 222, and with the clamp door 434 closed, the latch portion 452 of the latch member 450 is latched to the fastening groove 436a of the clamp door 434 and a lever handle 446 of a lever member 440 is pushed.

The lever member 440 is rotatably coupled to the hinge holes 444a of the latch member connecting portion 431b by the hinge 444, which is coupled to lever rotating holes 442 of the lever member 440. In addition, the lever member 440 is rotatably coupled at the middle thereof to the latch member 450 by the hinge 454 of the latch member 450, and is provided at one end thereof with the level handle 446, by which the latch member 450 can be pulled after the latch member 450 is latched to the clamp door 434.

The latch member 450 includes a latch plate 451 and guide bars 456 formed at both sides of the latch plate 451 and coupled to the hinge 454. Here, the latch member 450 is hingedly coupled at one side of the latch plate 451 to the middle of the lever member 440 by the hinge 454 connected to the guide bars 456. In addition, the latch member 450 is formed to a wider width than that of the clamp door 434 to prevent the latch member 450 from being separated from the clamp body 431 and is formed at one end thereof with a cylindrical latch spindle 452a, which is coupled to left and right coupling holes 452b of the guide bars 456 at both sides of the latch member 450 such that the latch portion 452 can be latched to a linear fastening groove 436b of the clamp door 434, and a support shaft of the hinge 454 is received in a hinge receiving groove 431c to allow the clamp door 434 to be more tightly fastened to the clamp body 431 when the clamp door 434 is fastened thereto by pulling the lever handle 446 backward.

Figure 5:
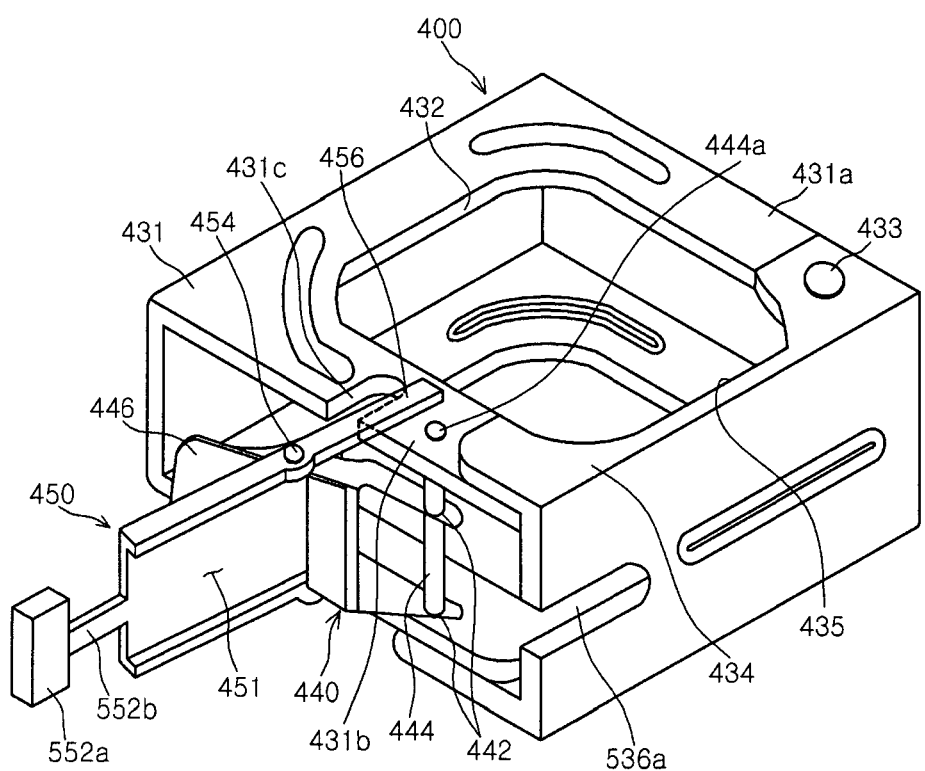
FIG. 5 is a perspective view of a clamping structure for mounting a reducer for sprinklers according to a second embodiment of the present invention.

FIG. 5 is a perspective view of a clamping structure for mounting a reducer for sprinklers according to a second embodiment of the present invention.

The latch member according to this embodiment has the same fundamental structure as that of the latch member shown in FIG. 3 and FIG. 4, and thus will be described using the same terms and reference numerals.

Referring to FIG. 5, according to a second embodiment of the invention, a clamp 400 includes a clamp body 431 that is formed at opposite sides thereof with a door connecting portion 431a and a latch member connecting portion 431b to form a rectangular shape with one open side, and a clamp door 434 that can be rotated about a hinge pin 433 formed at the door connecting portion 431a when a latch member 450 is released. According to this embodiment, the clamp 400 may be moved to a desired place, with a support frame 100 inserted into one side of the clamp body 431.

The clamp body 431 and the clamp door 434 are formed with a clamp groove 432 and a coupling groove 435, respectively, to define a space capable of receiving a body 222 of a sprinkler 200 when the body 222 is inserted into the clamp. Thus, in order to provide a clamping state between the clamp 400 and the sprinkler 200, the body 222 of the sprinkler 200 is inserted into the clamp body 431 in an opening/closing direction of the clamp door 434 without separating a spray nozzle 224 from the body 222, and with the clamp door 434 closed, a latch portion 452 of the latch member 450 is latched to an opened fastening groove 536a of the clamp door 434 and a lever handle 446 of a lever member 440 is pushed.

The lever member 440 is rotatably coupled to hinge holes 444a of the latch member connecting portion 431b by a hinge 444, which is coupled to lever rotating holes 442 of the lever member 440. In addition, the lever member 440 is rotatably coupled at the middle thereof to the latch member 450 by a hinge 454 of the latch member 450, and is provided at one end thereof with the level handle 446, by which the latch member 450 can be pulled after the latch member 450 is latched to the clamp door 434.

The latch member 450 includes a latch plate 451 and guide bars 456 formed at both sides of the latch plate 451 and coupled to the hinge 454. Here, the latch member 450 is hingedly coupled at one side of the latch plate 451 to the middle of the lever member 440 by the hinge 454 connected to the guide bars 456. In addition, the latch member 450 is formed so as not to be separated from the clamp body 431 and is formed at one end thereof with a latch portion 552a and a connecting portion 552b to form a T shape, such that the latch member 450 can be latched to the opened fastening groove 536a of the clamp door 434, and a support shaft of the hinge 454 is received in a hinge receiving groove 431c to allow the clamp door 434 to be more tightly fastened to the clamp body 431 when the clamp door 434 is fastened thereto by pulling the lever handle 446 backward.

Figure 6:
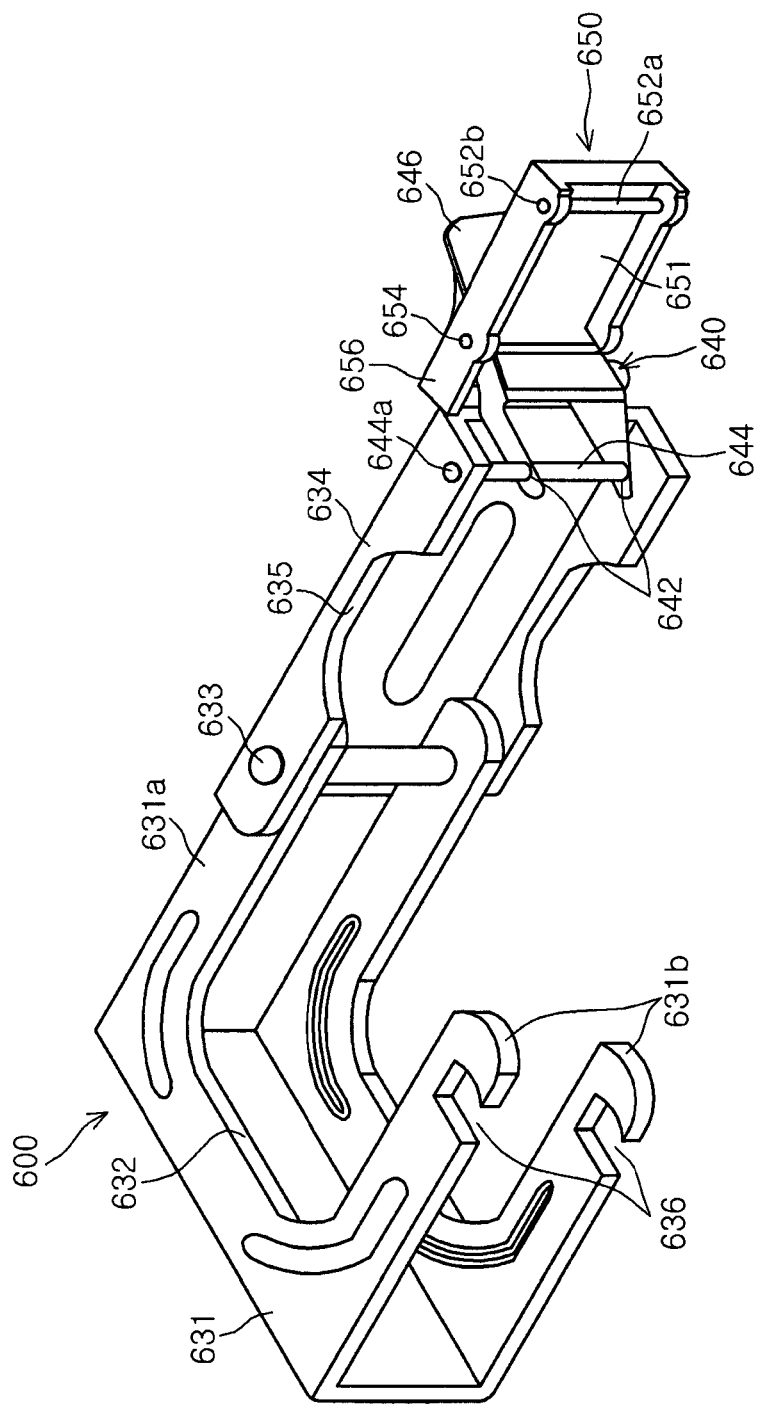
FIG. 6 is a perspective view of a clamping structure for mounting a reducer for sprinklers according to a third embodiment of the present invention.

FIG. 6 is a perspective view of a clamping structure for mounting a reducer for sprinklers according to a third embodiment of the present invention.

As shown in FIG. 6, according to a third embodiment of the invention, a clamp 600 includes a clamp body 631 that is formed at opposite sides thereof with a door connecting portion 631a and a latch member connecting portion 631b to form a rectangular shape with one open side, and a clamp door 634 that can be rotated about a hinge pin 633 formed at the door connecting portion 631a when a latch member 650 is released. In this structure, the clamp 600 may be moved to a desired place, with a support frame 100 inserted into one side of a clamp body 631. Here, the door connecting portion 631a has a longer length than the latch member connecting portion 631b so as to avoid interference with a hinge 654 formed in the latch member 650 upon fastening of the clamp door 634, which will be described below.

The clamp body 631 and the clamp door 634 are formed with a clamp groove 632 and a coupling groove 635, respectively, to define a space capable of receiving a body 222 of a sprinkler 200 when the body 222 is inserted into the clamp 600. Thus, in order to provide a clamping state between the clamp 600 and the sprinkler 200, the body 222 of the sprinkler 200 is inserted into the clamp body 631 in an opening/closing direction of the clamp door 634 without separating a spray nozzle 224 from the body 222, and with the clamp door 634 closed, a cylindrical latch spindle 652a of the latch member 650 is latched to an opened fastening groove 636 of the latch member connecting portion 631b formed in the clamp body 631 and a lever handle 646 of a lever member 640 is pushed.

The lever member 640 is rotatably coupled to hinge holes 644a of the clamp door 634 by a hinge 644, which is coupled to lever rotating holes 642 of the lever member 640. In addition, the lever member 640 is rotatably coupled at the middle thereof to the latch member 650 by a hinge 654 of the latch member 650, and is provided at one end thereof with the level handle 646, by which the latch member 650 can be pulled after the latch member is latched to the opened fastening groove 636 formed in the latch member connecting portion 631b.

The latch member 650 includes a latch plate 651 and guide bars 656 formed at both sides of the latch plate 651 and coupled to the hinge 654. Here, the latch member 650 is hingedly coupled at one side of the latch plate 651 to the middle of the lever member 640 by the hinge 654 connected to the guide bars 656. In addition, the latch member 650 is formed to a wider width than that of the clamp door 634 to prevent the latch member 650 from being separated from the clamp body 631 and is provided at one end thereof with the cylindrical latch spindle 652a, which is coupled to left and right coupling holes 652b of the latch member 650, such that the cylindrical latch spindle 652a can be latched to the opened fastening groove 636 of the latch member connecting portion 631b.

Figure 7:
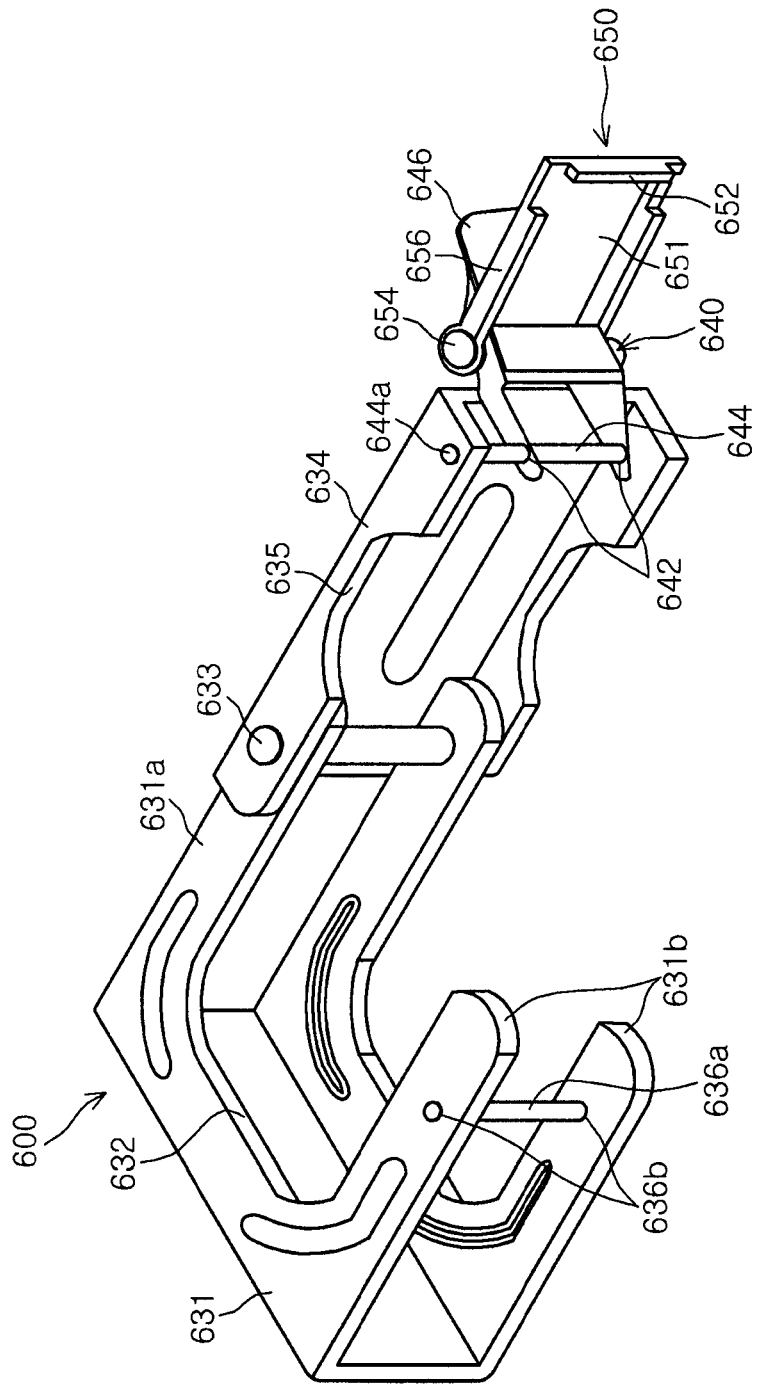
FIG. 7 is a perspective view of a modification of a latch member according to the third embodiment of the present invention.

FIG. 7 shows modification of the latch member according to the third embodiment.

The latch member according to this embodiment has the same fundamental structure as that of the latch member shown in FIG. 6, and thus will be described using the same terms and reference numerals.

As shown, in this embodiment, the clamp 600 includes a clamp body 631 that is formed at opposite sides thereof with the door connecting portion 631a and the latch member connecting portion 631b to form a rectangular shape with one open side, and the clamp door 634 that can be rotated about the hinge pin 633 formed at the door connecting portion 631a when the latch member 650 is released. According to this embodiment, the clamp 600 may be moved to a desired place, with a support frame 100 inserted into one side of the clamp body 631. Here, the door connecting portion 631a is longer than the latch member connecting portion 631b so as to avoid interference with the hinge 654 formed in the latch member 650 upon fastening of the clamp door 634, which will be described below.

The clamp body 631 and the clamp door 634 are formed with the clamp groove 632 and the coupling groove 635, respectively, to define a space capable of receiving the body 222 of the sprinkler 200 when the body 222 is inserted into the clamp. Thus, in order to provide a clamping state between the clamp 600 and the sprinkler 200, the body 222 of the sprinkler 200 is inserted into the clamp body 631 in an opening/closing direction of the clamp door 634 without separating the spray nozzle 224 from the body 222, and with the clamp door 634 closed, the latch spindle 652a of the latch member 650 is latched to a cylindrical latch spindle 636a of the latch member connecting portion 631b formed in the clamp body 631, and a lever handle 646 of a lever member 640 is pushed.

The lever member 640 is rotatably coupled to the hinge holes 644a of the clamp door 634 by the hinge 644, which is coupled to the lever rotating holes 642 of the lever member 640. In addition, the lever member 640 is rotatably coupled at the middle thereof to the latch member 650 by the hinge 654 of the latch member 650, and is provided at one end thereof with the level handle 646, by which the latch member 650 can be pulled after the latch member 650 is latched to the cylindrical latch spindle 636a coupled to the latch member connecting portion 631b of the clamp body 631 through left and right hinge coupling holes 636b thereof.

The latch member 650 includes a latch plate 651 and guide bars 656 formed at both sides of the latch plate 651 and coupled to the hinge 654. Here, the latch member 650 is hingedly coupled at one side of the latch plate 651 to the middle of the lever member 640 by the hinge 654 connected to the guide bars 656. In addition, the latch member 650 is formed at one end thereof with an L-shaped latch portion 652 such that the latch member 650 can be pulled after the latch member 650 is latched to the cylindrical latch spindle 636a coupled to the latch member connecting portion 631b of the clamp body 631 through left and right hinge coupling holes 636b thereof.

Figure 8:
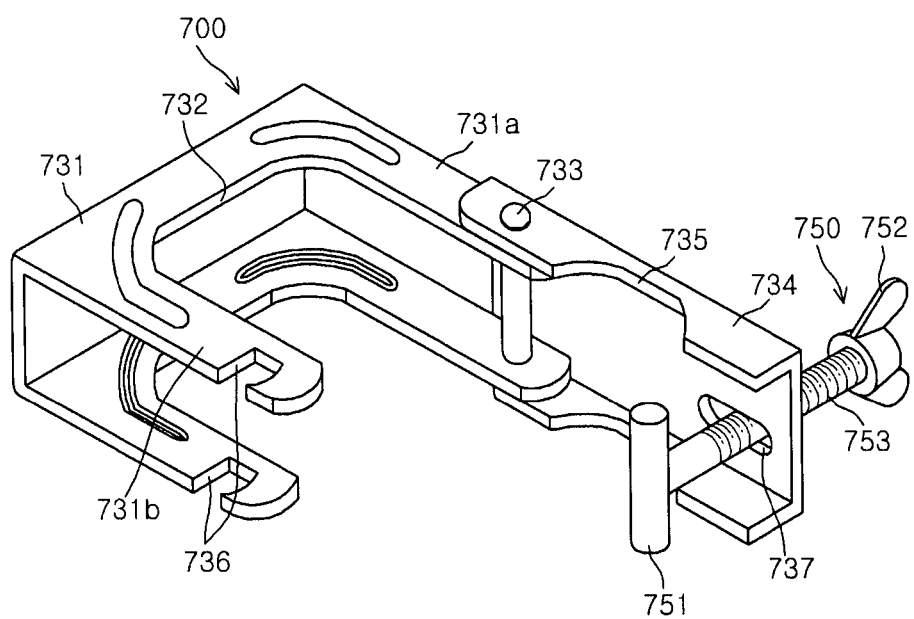
FIG. 8 is a perspective view of a clamping structure for mounting a reducer for sprinklers according to a fourth embodiment of the present invention.
Figure 9:
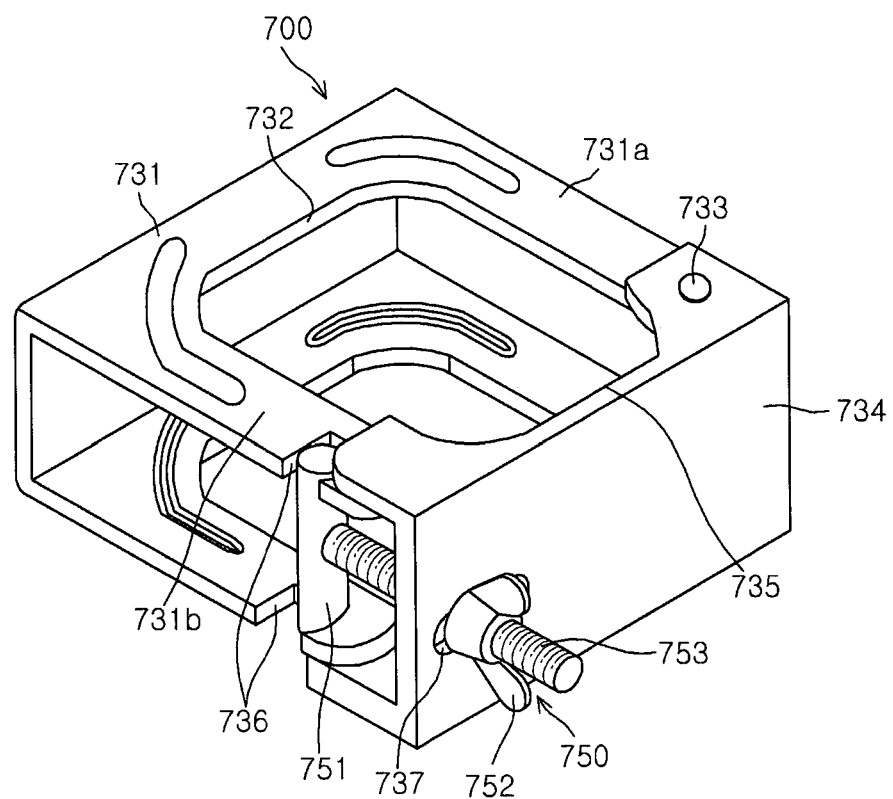
FIG. 9 is a perspective view of the clamping structure shown in FIG. 8 in a coupled state.

FIG. 8 is a perspective view of a clamping structure for mounting a reducer for sprinklers according to a fourth embodiment of the present invention and FIG. 9 is a perspective view of the clamping structure of FIG. 8 in a coupled state.

As shown in the drawings, the fourth embodiment of the invention provides a clamping structure which allows a clamp door 734 to be maintained in a clamped state by a latch member 750 without using the lever member 440 or 640 of the first to third embodiments.

In the fourth embodiment, a clamp 700 includes a clamp body 731 that is respectively formed at opposite sides thereof with a door connecting portion 731a and a latch member connecting portion 731b to form a rectangular shape with one open side, and a clamp door 734 that is coupled to one end of the door connecting portion 731a to be rotated about a hinge pin 733. The hinge pin 733 acts as a rotation coupling point. According to this embodiment, the clamp 700 may be moved to a desired place, with a support frame 100 inserted into one side of the clamp body 731.

A fastening groove 736 is formed at each of upper and lower portions on an outer side of one end of the latch member connection portion 731b opposite the hinge pin 733.

The clamp body 731 and the clamp door 734 are formed with a clamp groove 732 and a coupling groove 735, respectively, to define a space capable of receiving a body 222 of a sprinkler 200 when the body 222 is inserted into the clamp.

The clamp door 734 is formed at one side thereof with a latch member fastening hole 737, through which a latch member 750 passes to be coupled to the clamp door. The latch member 750 has a linear body, which is provided at one end thereof with a T-shaped latch spindle 751 and is formed at the other side thereof with threads 753 to be fastened to a nut 752.

Here, the latch member fastening hole 737 has an elongated hole shape, which is slightly wider in a longitudinal direction than in a vertical direction, that is, the diameter of the latch member 750 contacting the latch member fastening hole 737, whereby the location of the latch member 750 can be adjusted within the latch member fastening hole 737 via a slight clearance therebetween.

As the clamp door 734 is rotated about the hinge pin 733 of the hinge pin 733, the T-shaped latch spindle 751 of the latch member 750 is fitted into the fastening grooves 736 formed at one end of the latch member connection portion 731*b*.

Thus, the clamp door 734 may be opened or closed by being rotated about the hinge pin 733 provided to the door connecting portion 731*a* after the latch member 750 is released.

The clamp body 731 and the clamp door 734 are formed with the clamp groove 732 and the coupling groove 735, respectively. Thus, in order to provide a firm clamping state between the clamp 700 and the sprinkler 200, the body 222 of the sprinkler 200 is inserted into the clamp body 731 in an opening/closing direction of the clamp door 734 without separating a spray nozzle 224 from the body 222. Then, the clamp door 734 is closed by being rotated about the hinge pin 733 towards the fastening groove 736 of the latch member connection portion 731*b*, and the T-shaped latch spindle 751 of the latch member 750 is latched to the fastening groove 736 of the latch member connection portion 731*b*. Finally, the nut 752 is engaged with the threads 753 formed on the latch member 750 penetrating outwards through the clamp door 734, whereby the body 222 of the sprinkler 200 can be tightly coupled to the clamp 700, with the body 222 placed between the clamp body 731 and the clamp door 734, thereby providing a firm clamping state therebetween.

In this way, according to the embodiments, the clamp door can be easily rotated about the rotation coupling point of the hinge pin to be rapidly and easily coupled to or separated from an opposite side of the rotation coupling point using a fixed hinge member.

Although some embodiments have been provided to illustrate the invention, it should be understood that these embodiments are given by way of illustration only, and that various modifications, variations, and alterations can be made without departing from the spirit and scope of the present invention. Therefore, the scope of the present invention should be limited only by the accompanying claims and equivalents thereof.

What is claimed is:

1. A clamping structure for mounting a reducer, comprising:
    a clamp body that is formed at opposite sides thereof with a door connecting portion and a latch member connecting portion to form a rectangular shape with one open side; and
    a clamp door that can be rotated about a hinge pin formed at the door connecting portion,
    wherein the clamp door is formed at one side thereof with a fastening portion, to which a latch portion of a latch member is latched to allow a lever handle of a lever member to be pushed, and wherein the lever member is coupled at one end thereof to the latch member connecting portion of the clamp body by a hinge and is rotatably coupled at a middle thereof to the latch member by a hinge of the latch member.

2. The clamping structure according to claim 1, wherein the fastening portion is a through hole-shaped fastening groove formed through a front surface of the clamp door, and the latch portion of the latch member is a hook-shaped latch portion.

3. The clamping structure according to claim 1, wherein the fastening portion is a linear fastening groove formed on a front surface of the clamp door; the latch portion of the latch member is a cylindrical latch spindle formed at one end of the latch member; the latch member is hingedly coupled to the middle of the lever member by the hinge and is formed at both sides thereof with guide bars; and the cylindrical latch spindle is coupled to left and right coupling holes of the guide bars so as to be latched to the door member-fastening groove formed on the front surface of the clamp door.

4. The clamping structure according to claim 1, wherein the fastening portion is an opened door member-fastening groove formed on the front surface of the clamp door; the latch portion of the latch member is a latch portion formed at one end of the latch member and connected to a connecting portion to form a T shape such that the latch portion can be latched to the opened door member-fastening groove of the clamp door; and the latch member is hingedly coupled to the middle of the lever member by a hinge.

5. A clamping structure for mounting a reducer, comprising:
    a clamp body that is formed at opposite sides thereof with a door connecting portion and a latch member connecting portion to form a rectangular shape with one open side; and
    a clamp door that can be rotated about a hinge pin formed at the door connecting portion,
    wherein the latch member connecting portion is formed at one side thereof with an opened fastening groove, to which one end of a latch member is latched to allow a lever handle placed at one end of a lever member to be pushed;
    wherein the lever member is coupled to lever rotating holes of the lever member by a hinge formed on the clamp door and is rotatably coupled at a middle thereof to the latch member by a hinge of the latch member; and
    wherein the latch member is hingedly coupled to a middle of the lever member by the hinge of the latch member, is provided at both sides thereof with guide bars, and is provided at one end thereof with a cylindrical latch spindle, such that the cylindrical latch spindle of the latch member can be latched to the opened fastening groove on the latch member connecting portion to be pulled.

6. A clamping structure for mounting a reducer, comprising:
    a clamp body that is formed at opposite sides thereof with a door connecting portion and a latch member connecting portion to form a rectangular shape with one open side; and
    a clamp door that can be rotated about a hinge pin formed at the door connecting portion,
    wherein the clamp door is formed at one side thereof with a latch member fastening hole, through which a latch member passes to be coupled to the clamp door, the latch member having a linear body which is provided at one side thereof with a T-shaped latch spindle and is formed at the other side thereof with threads to be fastened to a nut, the clamp body having a fastening groove formed at each of upper and lower portions on an outer side of one end of the latch member connection portion opposite the rotation coupling point of the hinge pin.

* * * * *